(12) United States Patent
Honsberg et al.

(10) Patent No.: US 6,722,478 B2
(45) Date of Patent: Apr. 20, 2004

(54) ASSEMBLY FOR VEHICLE BRAKE DISK

(75) Inventors: Wolfram Honsberg, Dorfen (DE);
Georg Eichner, Ismaning (DE);
Martin Heidenthaler,
Kirchanschoering (DE); Raphael Wanitschke, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/986,996

(22) Filed: Nov. 13, 2001

(65) Prior Publication Data

US 2002/0056597 A1 May 16, 2002

(30) Foreign Application Priority Data

Nov. 10, 2000 (DE) .......................................... 100 55 768

(51) Int. Cl.[7] .............................................. F16D 65/38
(52) U.S. Cl. ................................... 188/73.37; 301/6.91
(58) Field of Search ........................ 188/218 XL, 17, 188/18 A, 73.1, 73.2, 73.31, 73.32, 73.36, 73.37; 301/6.91, 6.8, 6.1, 35.631; 181/207

(56) References Cited

U.S. PATENT DOCUMENTS

| | | | |
|---|---|---|---|
| 3,298,476 A | | 1/1967 | Day |
| 3,794,384 A | * | 2/1974 | Rice ............................. 301/5.1 |
| 3,866,977 A | * | 2/1975 | Rice ............................. 301/5.1 |
| 4,327,792 A | * | 5/1982 | Landers ...................... 152/209.2 |
| 4,523,666 A | * | 6/1985 | Murray .................. 188/18 XL |
| 4,679,665 A | * | 7/1987 | Smith ...................... 188/218 XL |
| 5,735,366 A | | 4/1998 | Suga et al. |
| 6,186,292 B1 | * | 2/2001 | Dickerson et al. ..... 188/218 XL |
| 6,264,012 B1 | * | 7/2001 | Yamazaki et al. ............. 188/74 |

FOREIGN PATENT DOCUMENTS

| | | |
|---|---|---|
| DE | 2 343 714 | 3/1974 |
| DE | 24 25 423 | 12/1975 |
| DE | 3107124 A1 | 9/1982 |
| DE | 3505516 A1 * | 8/1986 |
| DE | 195 28 434 | 2/1997 |
| DE | 198 06 532 | 9/1999 |
| DE | 19915215 | 10/2000 |
| EP | 1 048 872 | 4/2000 |
| GB | 1140078 | 1/1969 |
| GB | 2093936 A | 9/1982 |
| GB | 2 232 449 | 12/1990 |
| JP | 58124834 | 7/1983 |
| JP | 11159550 | 6/1999 |
| JP | 2001234956 | 8/2001 |
| WO | 96/41968 | 12/1996 |

* cited by examiner

*Primary Examiner*—Jack Lavinder
*Assistant Examiner*—Xuan Lan Nguyen
(74) *Attorney, Agent, or Firm*—Crowell & Moring LLP

(57) ABSTRACT

An assembled vehicle brake disk has a basically rotationally symmetrical friction ring which is fastened by way of several linking points in a rigid or floating manner to a basically rotationally symmetrical hub part. At least two distances between respectively adjacent linking points, which distances follow one another in the circumferential direction, differ from one another, in which case, viewed in their entirety, the linking points are arranged in a non-uniformly distributed manner along the circumference. Preferably, an uneven number of linking points are provided which may be arranged to be very asymmetrically distributed along the circumference. The number of linking points may be in the order of between 5 and 15, a smaller number being provided per circumferential segment with respect to lower-frequency noise radiations, and a higher number being provided with respect to higher-frequency noise radiations.

19 Claims, 1 Drawing Sheet

ASSEMBLY FOR VEHICLE BRAKE DISK

BACKGROUND AND SUMMARY OF THE INVENTION

This application claims the priority of German Application No. DE 100 55 768.6, filed Nov. 10, 2000, the disclosure of which is expressly incorporated by reference herein.

The invention relates to an assembled vehicle brake disk having a basically rotationally symmetrical friction ring which is fastened by way of several linking points in a rigid or floating manner on a basically rotationally symmetrical hub part. With respect to the technical environment, reference is made, for example, to German Patent Document DE 195 28 434 A1.

Particularly with respect to light-weight construction aspects, brake disks are no longer produced in one piece but are assembled of a friction ring as well as a so-called hub part which may be constructed, for example, as on passenger car brake disks, in a conventionally pot-shaped manner. In DE 195 28 434 A1 only one example thereof is shown, in which, conventionally, not only the friction ring as well as the hub part represent basically rotationally symmetrical components but also so-called linking points, by way of which the friction ring is fastened to the hub part, are arranged in a symmetrically or uniformly distributed manner along the brake disk circumference. In this case, the present invention relates to many different types of linking points. That is, the problems described in the following as well as the invention are not limited to special constructions of linking points. Only several discrete linking points should be provided which fix the friction ring with respect to the hub part at least in the circumferential direction. In contrast, particularly in the axial direction, the friction ring can definitely be fastened in a floating manner on the hub part. Only as examples of possible constructions of the linking points, pin-shaped or screw-shaped connection elements should be mentioned here which are preferably aligned in the axial direction or radial direction of the brake disk. However, in addition, connections are mentioned which are produced by deforming, for example, lugs or the like.

A problem which constantly recurs basically on brakes (at least during their development) is the so-called brake squealing which, among other things, is significantly determined by the large number of natural frequencies and the type of natural oscillation forms of the entire vehicle braking system. It is therefore an object to keep the excitation of the natural frequencies or the natural oscillation forms of the individual brake disk components and of the entire system as low as possible in order to avoid undesirable noise radiations during a braking operation.

In principle, the "loudspeakers" or resonant bodies which are significant for the radiation of noise in a vehicle braking system are formed by the brake disks. As a result of their rotationally symmetrical construction, the natural oscillation forms develop here almost uniformly along the outer circumference. In the case of friction rings with a floating bearing, comparable situations may also occur for the partially free interior edge of the friction ring, which disadvantageously still intensifies the possibilities of generating noise.

It is an object of certain preferred embodiments of the present invention to indicate how brake squealing or undesirable noise radiations at a brake disk having a rotationally symmetrical friction ring which is fastened by way of a plurality of linking points, in a rigid or floating manner, to a basically rotationally symmetrical hub part, can be effectively prevented or at least kept as low as possible.

A solution to this problem, according to certain preferred embodiments of the invention, is characterized in that at least two distances, which follow one another in the circumferential direction, differ from one another between mutually adjacent linking points respectively. Advantageous further developments are contained in preferred embodiments.

It was found that the natural oscillation forms of a brake disk which exist as a result of the system can be interfered with by a targeted arrangement of the linking points with respect to their formation. That is, the linking points form so-called interference points or a difficulty with respect to the oscillation buildup in the brake disk. Since the natural oscillation forms of the disk viewed along its circumference can, in practice, develop only in a uniform manner, as a result of a non-uniform circumferential distribution of the above-mentioned linking points between the friction ring and the hub part, critical natural oscillation forms or natural frequencies of the assembled brake disk can even be eliminated. In this case, it may be sufficient for the non-uniform distribution of the linking points in the circumferential direction of the brake disk to be created such that, only in the case of three successive linking points, the distances will differ between two adjacent linking points respectively. For example, the first and second linking point enclose a sector angle of 20°, and the second and third linking point enclose a sector angle of, for example, 35°. However, it is also possible to arrange all linking points in their entirety to be non-uniformly distributed in the circumferential direction.

In this case, it is particularly advantageous for the total number of linking points to be uneven because the natural oscillations of the disk can form only in an even-numbered fashion. In this case, the absolute amount of the distance between the linking points and the number of linking points decide the frequency range which can be influenced thereby. Thus, a disk construction with a total of five linking points is interfered with with respect to its oscillation behavior at a clearly lower frequency than one which has, for example, nine linking points. Generally, a lower number of linking points per circumferential segment may therefore be provided with respect to lower-frequency noise radiations and a higher number may be provided with respect to higher-frequency noise radiations.

Other objects, advantages and novel features of the present invention will become apparent from the following detailed description of the invention when considered in conjunction with the accompanying drawings.

DETAILED DESCRIPTION OF THE DRAWING

Figure 1:
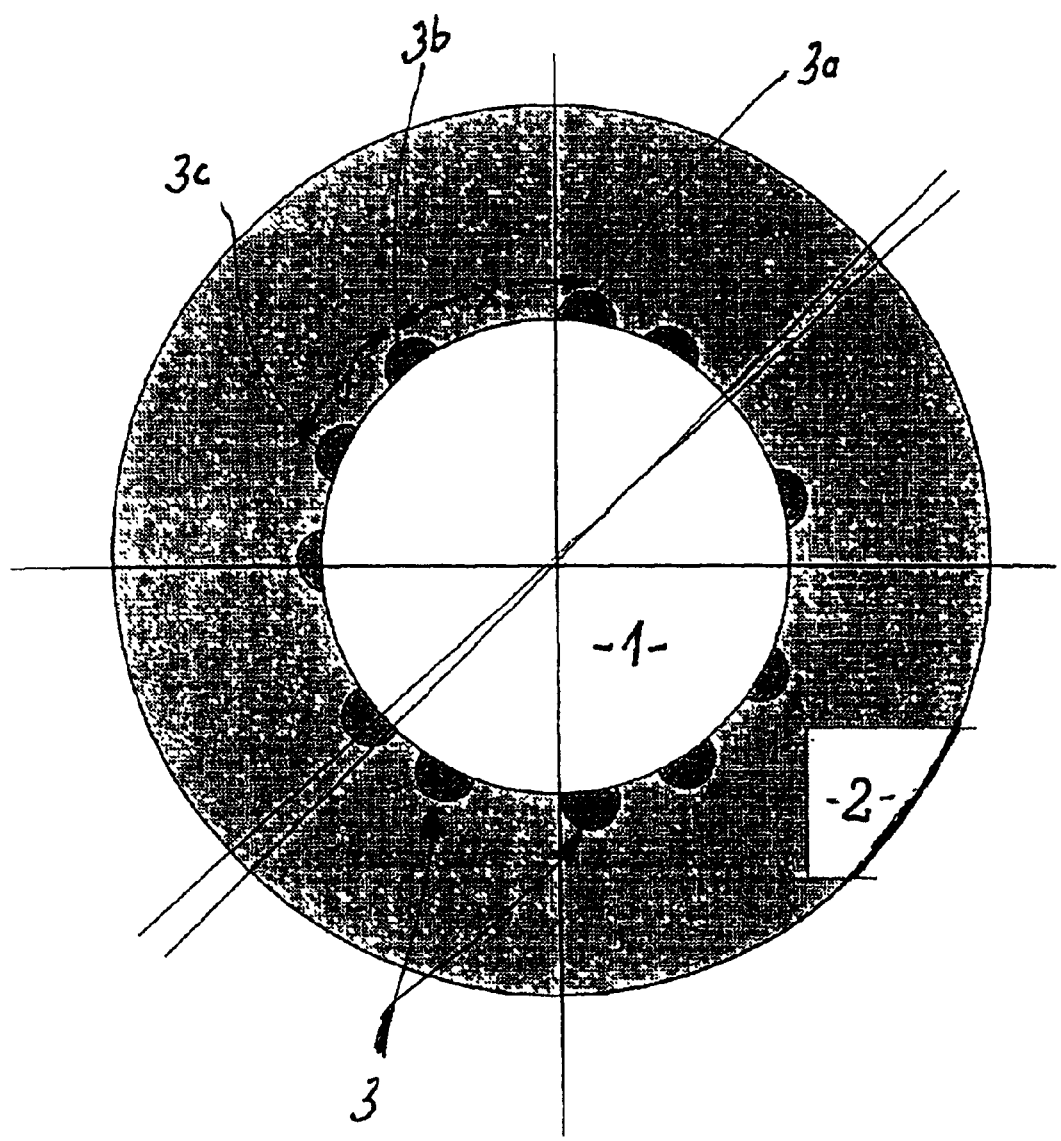
FIG. 1 shows a schematic lateral diagram of an embodiment.

The illustrated vehicle brake disk, as shown in FIG. 1, is assembled of a so-called hub part 1 as well as a friction ring 2. As customary, brake linings, which are not shown, can act in a pressing manner upon the friction ring 2, while the hub part 1 is appropriately fixed to a wheel, for example, of a passenger car or of a motorcycle. The friction ring 2 and the hub part 1 are connected with one another by way of several linking points 3 which are illustrated here only abstractly and which, as indicated above, may have many different constructions. As indicated—deviating from the known prior art—these linking points 3 are, in their entirety, arranged in a relatively non-uniformly distributed manner along the circumference or in the circumferential direction. In particular, not only an uneven number (specifically 11) linking points are provided, the distances x and y of the respectively adjacent linking points 3a and 3b or 3b and 3c, which distances follow one another in the circumferential direction, differ from one another with respect to their amounts. As a result, the above-described effects are achieved. That is, critical natural oscillation forms of the brake disk can be eliminated thereby.

Deviating from the illustrated embodiment, the non-uniform distribution of the linking points 3 along the outer circumference of the hub part 1 or along the inner circumference of the friction ring 2 can naturally be more intensive, that is, more non-uniform. Thus, for diverse applications, for example, a considerably asymmetrical arrangement of the linking points 3 may be provided, for example, such that the brake disk can be imagined to be divided into two sections of 180° respectively, and that, for example, only three linking points are provided in one sector, whereas twelve linking points are situated in the other sector. A preferred number of so-called linking points 3 is in the order of between five to fifteen, but these indicated numbers are very dependent on the respective construction of the linking points.

In addition, as a result of a variable—measured in the radial direction—width of the friction ring 2, along its circumference, an additional interference with the rotationally symmetrical design can be introduced, so that an additional displacement of the natural oscillation behavior of the brake disk can be achieved.

In addition, when a visually uniform appearance of the brake disk with visible linking points is desired, in addition to the functionally effective linking points (which in this case are arranged to be non-uniformly distributed along the circumference), additionally visually effective linkage points may be provided which, however, are functionally ineffective, and may be arranged such that all linking points in their entirely are arranged in a uniformly distributed manner along the circumference.

It should be pointed out explicitly that a large number of additional details may definitely be designed to deviate from the above explanations without leaving the content of the claims. By way of the characteristics essential to the invention, brake noises can always be avoided or at least clearly reduced when a brake is operated. The reason is that the natural oscillation forms of a brake disk according to certain preferred embodiments of the invention, depending on the location of the problem, can be interfered with in a targeted manner with respect to their formation by way of the above-mentioned control variables. Advantageously, by way of these characteristics, an inhomogeneous heat expansion of the brake disk also occurs—caused by the introduction of heat during a braking operation—so that the problems of the brake judder, which are known to the person skilled in the art, can also be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembled vehicle brake disk comprising a basically rotationally symmetrical friction ring which is fastened by way of a plurality of linking points to a basically rotationally symmetrical hub part, wherein at least two distances between respectively adjacent linking points, said distances following one another in the circumferential direction, differ from one another; and wherein an uneven number of the linking points are provided.

2. A brake disk according to claim 1, wherein the linking points are arranged to be highly asymmetrically distributed along the circumference.

3. A brake disk according to claim 2, wherein, in addition to the linking points which are functionally effective, additionally visually effective but functionally ineffective linking points are provided, and wherein all of the linking points are arranged in a uniformly distributed manner along the circumference.

4. A brake disk according to claim 2, wherein a number of the linking points is between 5 and 15, and a smaller number of the linking points is provided per circumferential segment with respect to lower-frequency noise radiations, and a higher number of the linking points is provided with respect to higher-frequency noise radiations.

5. A brake disk according to claim 1, wherein, in addition to the linking points which are functionally effective, additionally visually effective but functionally ineffective linking points are provided, and wherein all of the linking points are arranged in a uniformly distributed manner along the circumference.

6. A brake disk according to claim 5, wherein a number of the linking points is between 5 and 15, and a smaller number of the linking points is provided per circumferential segment with respect to lower-frequency noise radiations, and a higher number of the linking points is provided with respect to higher-frequency noise radiations.

7. A brake disk according to claim 1, wherein a number of the linking points is between 5 and 15, and a smaller number of the linking points is provided per circumferential segment with respect to lower-frequency noise radiations, and a higher number of the linking points is provided with respect to higher-frequency noise radiations.

8. An assembled vehicle brake disk comprising a basically rotationally symmetrical friction ring which is fastened by way of a plurality of linking points to a basically rotationally symmetrical hub part, wherein at least two distances between respectively adjacent linking points, said distances following one another in the circumferential direction, differ from one another;

wherein all of the linking points are arranged in a non-uniformly distributed manner along the circumference; and wherein an uneven number of the linking points are provided.

9. A brake disk according to claim 8, wherein, in addition to the linking points which are functionally effective, additionally visually effective but functionally ineffective linking points are provided, and wherein all of the linking points are arranged in a uniformly distributed manner along the circumference.

10. A brake disk according to claim 8, wherein the linking points are arranged to be highly asymmetrically distributed along the circumference.

11. A brake disk for a vehicle, comprising:

a substantially rotationally symmetrical hub part, a substantially rotationally symmetrical friction ring, at least three linking point, which operably fasten the friction ring to the hub part, wherein a first distance between a first and second of the linking points, which are adjacent to one another, is different than a second distance between the second and a third of the linking points which are adjacent to one another, the first and second distances following one another in a circumferential direction; and wherein a ratio of the linking points on each half of the circumference is at least 2 to 1.

12. An assembled vehicle brake disk comprising a basically rotationally symmetrical friction ring which is fastened by way of a plurality of linking points to a basically rotationally symmetrical hub part, wherein at least two distances between respectively adjacent linking points, said distances following one another in the circumferential direction, differ from one another;

wherein all of the linking points are arranged in a non-uniformly distributed manner along the circumference.

13. A brake disk for a vehicle, comprising:

a substantially rotationally symmetrical hub part, a substantially rotationally symmetrical friction ring, at least three linking point, which operably fasten the friction ring to the hub part, wherein a first distance between a first and second of the linking points, which are adjacent to one another, is different than a second distance between the second and a third of the linking points which are adjacent to one another, the first and second distances following one another in a circumferential direction; and wherein a number of the linking points provided is uneven.

14. A brake disk according to claim 13, wherein the linking points around the circumference are non-uniformly distributed.

15. A brake disk according to claim 13, wherein functionally ineffective linking points are provided around the circumference in order to make the disk appear to have the linking points uniformly distributed.

16. A method of making a brake disk for a vehicle, comprising:

providing an essentially rotationally symmetrical hub part, fastening an essentially rotationally symmetrical friction ring by way of a plurality of linking points to the hub part, and arranging at least one of the linking point along a circumference so that the distance between the at least one of the linking points and an adjacent one of the linking points is different than a distance between the at least one of the linking points and an adjacent one of the linking points in an opposite direction along the circumference; and wherein an uneven number of the linking points is provided.

17. A method according to claim 16, wherein the plurality of linking points is arranged in a non-uniformly distributed manner along the circumference.

18. A method according to claim 16, wherein the linking points are highly asymmetrically distributed along the circumference.

19. A method according to claim 16, wherein functionally ineffective linking points are provided along the circumference in addition to the plurality of the linking points which are functionally effective, thereby giving an appearance of uniformly distributed arrangement of the linking points.

* * * * *